United States Patent
Farraro (10) Patent No.: US 9,589,123 B2
(45) Date of Patent: *Mar. 7, 2017

(54) MOBILE AUTHENTICATION USING A WEARABLE DEVICE

(71) Applicant: eBay Inc., San Jose, CA (US)

(72) Inventor: Eric J. Farraro, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,431

(22) Filed: Oct. 23, 2015

(65) Prior Publication Data

US 2016/0042170 A1    Feb. 11, 2016

Related U.S. Application Data

(63) Continuation of application No. 14/023,285, filed on Sep. 10, 2013, now Pat. No. 9,213,820.

(51) Int. Cl.
*H04L 29/06* (2006.01)
*G06F 21/35* (2013.01)
*H04W 4/00* (2009.01)
*H04W 12/06* (2009.01)

(52) U.S. Cl.
CPC .......... *G06F 21/35* (2013.01); *H04L 63/0853* (2013.01); *H04W 4/008* (2013.01); *H04W 12/06* (2013.01); *G06F 2221/2111* (2013.01)

(58) Field of Classification Search
CPC ............ G06F 21/35; G06F 2221/2111; H04L 63/0853; H04L 63/10; H04W 4/008; H04W 12/06

USPC ............. 726/2, 3, 5, 9, 10, 20; 455/410, 411
See application file for complete search history.

(56) References Cited

U.S. PATENT DOCUMENTS

| | | |
|---|---|---|
| 3,732,555 A | 5/1973 | Strenglein |
| 6,057,764 A | 5/2000 | Williams |
| 6,308,274 B1 | 10/2001 | Swift |

(Continued)

FOREIGN PATENT DOCUMENTS

| | | |
|---|---|---|
| CN | 105683986 A | 6/2016 |
| GB | 2402529 A | 12/2004 |

OTHER PUBLICATIONS

Gupta, "Proximity based access control in smart-emergency departments", Fourth Annual IEEE International Conference on Pervasive Computing and Communications Workshops, 2006, PerCom Workshops 2006, Mar. 13-17, 2006, 5 pages.*

(Continued)

*Primary Examiner* — Roderick Tolentino
*Assistant Examiner* — Walter Malinowski
(74) *Attorney, Agent, or Firm* — Schwegman, Lundberg & Woessner, P.A.

(57) ABSTRACT

A method of providing a user with an option to access a protected system by satisfying a reduced security measure is disclosed. An attempt by the user to access the protected system is detected. It is detected that a first security token system is within a first proximity to the protected system. Based on the detecting of the attempt by the user to access the protected system and the detecting that the first security token system is within the first proximity, the user is provided with the option to access the protected system by satisfying the reduced security measure.

14 Claims, 8 Drawing Sheets

(56) References Cited

U.S. PATENT DOCUMENTS

| | | | | |
|---|---|---|---|---|
| 6,487,600 B1* | 11/2002 | Lynch | ................ | H04L 29/06 709/204 |
| 6,700,475 B1 | 3/2004 | Geber et al. | | |
| 6,895,502 B1* | 5/2005 | Fraser | ................ | G06Q 20/42 713/168 |
| 7,222,878 B2* | 5/2007 | Imamura | ................ | B62D 1/195 280/731 |
| 7,353,391 B2* | 4/2008 | Sato | ................ | H04L 63/0492 380/270 |
| 7,575,166 B2 | 8/2009 | Mcnamara | | |
| 8,015,162 B2* | 9/2011 | Henzinger | ................ | G06F 17/3089 707/692 |
| 8,103,593 B2* | 1/2012 | Kim | ................ | G06F 21/10 380/201 |
| 8,566,337 B2* | 10/2013 | Smith | ................ | H04L 45/742 370/392 |
| 8,595,810 B1 | 11/2013 | Ben | | |
| 8,625,796 B1 | 1/2014 | Ben | | |
| 8,631,148 B2* | 1/2014 | Curtis | ................ | H04L 65/4076 709/203 |
| 8,793,184 B2 | 7/2014 | Lakshminarayanan | | |
| 8,850,609 B1* | 9/2014 | Juels | ................ | G06F 21/34 713/194 |
| 8,955,076 B1 | 2/2015 | Faibish et al. | | |
| 2004/0123160 A1* | 6/2004 | Mizrah | ................ | G06F 21/31 726/5 |
| 2004/0139050 A1* | 7/2004 | Barrett | ................ | G06F 21/34 |
| 2004/0172562 A1* | 9/2004 | Berger | ................ | G06F 21/316 726/7 |
| 2004/0243471 A1 | 12/2004 | Salmen et al. | | |
| 2005/0030151 A1 | 2/2005 | Singh | | |
| 2005/0039013 A1 | 2/2005 | Bajikar et al. | | |
| 2005/0148321 A1* | 7/2005 | Igarashi | ................ | H04L 63/08 455/411 |
| 2005/0275543 A1 | 12/2005 | Hisano | | |
| 2006/0136997 A1 | 6/2006 | Telek et al. | | |
| 2006/0236373 A1* | 10/2006 | Graves | ................ | G06F 19/327 726/3 |
| 2006/0293029 A1* | 12/2006 | Jha | ................ | H04M 1/72522 455/411 |
| 2007/0044095 A1* | 2/2007 | Banerjee | ................ | H04L 63/08 717/176 |
| 2007/0118886 A1* | 5/2007 | Martin | ................ | H04L 63/0435 726/5 |
| 2007/0132548 A1* | 6/2007 | Baraz | ................ | G06F 21/34 340/5.6 |
| 2007/0146120 A1 | 6/2007 | Kachouh | | |
| 2007/0229350 A1* | 10/2007 | Scalisi | ................ | G06F 21/35 342/350 |
| 2007/0277232 A1* | 11/2007 | Cates | ................ | H04L 63/061 726/6 |
| 2008/0015986 A1 | 1/2008 | Wright | | |
| 2008/0105751 A1* | 5/2008 | Landau | ................ | A63F 13/10 235/492 |
| 2008/0155649 A1* | 6/2008 | Maler | ................ | H04L 63/20 726/1 |
| 2008/0235781 A1* | 9/2008 | Sucher | ................ | H04L 63/0853 726/9 |
| 2009/0024663 A1* | 1/2009 | McGovern | ................ | G06F 21/577 |
| 2009/0083372 A1 | 3/2009 | Teppler | | |
| 2009/0125984 A1 | 5/2009 | Bilger et al. | | |
| 2009/0158034 A1* | 6/2009 | Gu | ................ | H04L 63/08 713/156 |
| 2009/0212909 A1* | 8/2009 | Burger | ................ | G06K 19/06206 340/5.81 |
| 2009/0222914 A1 | 9/2009 | Ozawa | | |
| 2009/0276823 A1* | 11/2009 | Vogler | ................ | G06F 21/316 726/1 |
| 2010/0048167 A1* | 2/2010 | Chow | ................ | H04L 29/12594 455/410 |
| 2010/0052856 A1 | 3/2010 | Macauley et al. | | |
| 2010/0091995 A1 | 4/2010 | Chen et al. | | |
| 2010/0094530 A1 | 4/2010 | Phuyal et al. | | |
| 2010/0138666 A1 | 6/2010 | Adams et al. | | |
| 2010/0140358 A1 | 6/2010 | Couck | | |
| 2010/0180339 A1* | 7/2010 | Finlayson | ................ | G06F 21/604 726/21 |
| 2010/0199086 A1 | 8/2010 | Kuang et al. | | |
| 2011/0039622 A1* | 2/2011 | Levenson | ................ | A63F 13/12 463/42 |
| 2011/0213807 A1* | 9/2011 | Mattsson | ................ | G06F 21/6245 707/802 |
| 2011/0291827 A1* | 12/2011 | Baldocchi | ................ | G08B 21/043 340/539.11 |
| 2011/0296513 A1* | 12/2011 | Kasad | ................ | G06F 21/35 726/9 |
| 2012/0100824 A1 | 4/2012 | Michael | | |
| 2012/0136921 A1 | 5/2012 | Samdadiya et al. | | |
| 2012/0214443 A1* | 8/2012 | Daigle | ................ | H04L 9/3228 455/411 |
| 2012/0284779 A1* | 11/2012 | Ingrassia, Jr. | ................ | G06F 21/70 726/5 |
| 2013/0035991 A1 | 2/2013 | Romero et al. | | |
| 2013/0104198 A1 | 4/2013 | Grim | | |
| 2013/0124346 A1 | 5/2013 | Baldwin et al. | | |
| 2013/0132016 A1 | 5/2013 | Dennis et al. | | |
| 2013/0171965 A1 | 7/2013 | Schrecker | | |
| 2013/0181847 A1* | 7/2013 | Willig | ................ | H04Q 9/00 340/870.03 |
| 2013/0225080 A1 | 8/2013 | Doss et al. | | |
| 2013/0283346 A1* | 10/2013 | Sun | ................ | H04W 12/06 726/3 |
| 2013/0318613 A1* | 11/2013 | Archer | ................ | G06F 21/577 726/25 |
| 2013/0326604 A1* | 12/2013 | Hird | ................ | G06F 21/00 726/7 |
| 2014/0032933 A1 | 1/2014 | Smith et al. | | |
| 2014/0075178 A1 | 3/2014 | Trethewey | | |
| 2014/0075499 A1 | 3/2014 | Arun et al. | | |
| 2014/0089673 A1 | 3/2014 | Luna | | |
| 2014/0091903 A1 | 4/2014 | Birkel et al. | | |
| 2014/0157401 A1 | 6/2014 | Alameh et al. | | |
| 2014/0181510 A1 | 6/2014 | Kita et al. | | |
| 2014/0189785 A1 | 7/2014 | Castro et al. | | |
| 2014/0189808 A1 | 7/2014 | Mahaffey et al. | | |
| 2014/0215559 A1 | 7/2014 | Ali et al. | | |
| 2014/0223526 A1* | 8/2014 | Lu | ................ | H04L 63/0407 726/6 |
| 2014/0278839 A1 | 9/2014 | Lynam et al. | | |
| 2014/0289827 A1 | 9/2014 | Tang | | |
| 2014/0359744 A1* | 12/2014 | Hillis | ................ | H04L 63/0853 726/9 |
| 2015/0046969 A1 | 2/2015 | Abuelsaad et al. | | |
| 2015/0056920 A1* | 2/2015 | Huttunen | ................ | H04B 7/26 455/41.2 |
| 2015/0074800 A1 | 3/2015 | Farraro | | |

OTHER PUBLICATIONS

Sastry, "Security Considerations for IEEE 802.15.4 Networks", WiSE'04, Oct. 1, 2004, 11 pages.*

Soriano, "SHAD: A Human-Centered Security Architecture for the Plan B Operating System", Proceedings of the Fifth Annual IEEE International Conference on Pervasive Computing and Communications (PerCom'07), 2007, 10 pages.*

"Access badge", Wikipedia, [Online]. Retrieved from the Internet: <URL: http://en.wikipedia.org/wiki/Access_badge>, (Accessed Aug. 28, 2014), 3 pgs.

"U.S. Appl. No. 14/023,285, Non Final Office Action mailed Mar. 5, 2015", 33 pgs.

"U.S. Appl. No. 14/023,285, Notice of Allowance mailed Jul. 29, 2015", 12 pgs.

"U.S. Appl. No. 14/023,285, Response filed Jun. 5, 2015 to Non Final Office Action mailed Mar. 5, 2015", 10 pgs.

"International Application Serial No. PCT/US2014/054355, International Search Report mailed Nov. 24, 2014", 2 pgs.

"International Application Serial No. PCT/US2014/054355, Written Opinion mailed Nov. 24, 2014", 5 pgs.

(56) References Cited

OTHER PUBLICATIONS

"Multi-factor authentication", Wikipedia, [Online]. Retrieved from the Internet: <URL: http://en.wikipedia.org/wiki/Multi-factor_authentication>, (Accessed Aug. 28, 2014), 18 pgs.

"Remote keyless system", Wikipedia, [Online]. Retrieved from the Internet: <URL: http://en.wikipedia.org/wiki/Keyless_entry>, (Accessed Aug. 28, 2014), 4 pgs.

"Security token", Wikipedia, [Online]. Retrieved from the Internet: <URL: http://en.wikipedia.org/wiki/Security_token>, (Accessed Aug. 28, 2014), 7 pgs.

Brain, Marshall, "HowStuffWorks—How Remote Entry Works", [Online]. Retrieved from the Internet: <URL: http://auto.howstuffworks.com/remote-entry.htm/printable>, (Accessed Aug. 28, 2014), 3 pgs.

Janssen, Cory, "What is a Security Token?—Definition from Techopedia", Techopedia, [Online]. Retrieved from the Internet: <URL: http://www.techopedia.com/definition/16148/security-token>, (Accessed Aug. 28, 2014), 1 pg.

Sengupta, Somini, "Computer Scientists Break Security Token Key in Record Time", © 2014The New York Times Company, [Online]. Retrieved from the Internet: <URL: http://bits.blogs.nytimes.com/2012/06/25/computer-scientists-break-security-token-key-in-reco . . .>, (Jun. 25, 2012), 3 pgs.

Woodford, Chris, "Two-factor authenticaton and one-time passwords—introduction", [Online]. Retrieved from the Internet: <URL: ttp://www.explainthatstuff.com/how-security-tokens-work.html>, (Aug. 20, 2014), 6 pgs.

"Canadian Application Serial No. 2,923,573, Office Action mailed Apr. 13, 2016", 5 pgs.

"European Application Serial No. 14843397.2, Response filed Jul. 20, 2016 to Communication pursuant to Rules 161(1) and 162 EPC mailed Apr. 19, 2016", 12 pgs.

\* cited by examiner

MOBILE AUTHENTICATION USING A WEARABLE DEVICE

REFERENCE TO RELATED APPLICATION

This application is a continuation of U.S. patent application Ser. No. 14/023,285, filed Sep. 10, 2013, which is hereby incorporated by reference in its entirety.

TECHNICAL FIELD

The present application relates generally to the technical field of security tokens, and, in one specific example, to using wearable computing devices as security tokens for accessing protected systems.

BACKGROUND

Access to mobile devices (e.g., laptop computers, tablet computers, smart phones, smart watches, Google Glass or other wearable computing devices, and so on) may be restricted (e.g., via security measures, such as, fingerprint recognition, password protection, and so on). This restricted access may be meant to ensure that only users of the device who can satisfy the security measures are able access functions of the device, applications executing on the device, data stored on the device, and so on.

However, in some cases, security measures that are more powerful than others (e.g., more likely to prevent access to unauthorized users than others) are also more burdensome for the authorized users to satisfy. For example, a device may require an authorized user to enter a password every time the user accesses the device. If the user needs to access the device often or quickly (e.g., to perform actions, such as negotiating with buyers and sellers on a network-based publication system, such as EBAY®, AMAZON®, or CRAIGSLIST®), satisfying this security measure may prevent the user from acting as quickly as he would like. This burden may lead to lost earnings or profits to the user, such as when the user must act quickly in marketplaces that are particularly time sensitive.

BRIEF DESCRIPTION OF THE DRAWINGS

Some embodiments are illustrated by way of example and not limitation in the figures of the accompanying drawing.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, a method of providing a user with an option to access a protected system by satisfying a reduced security measure is disclosed. An attempt by the user to access the protected system is detected. It is detected that a first security token system is within a first proximity to the protected system. Based on the detecting of the attempt by the user to access the protected system and the detecting that the first security token system is within the first proximity, the user is provided with the option to access the protected system by satisfying the reduced security measure.

In various embodiments, the methods disclosed herein reduce the friction required to access a mobile device or a device on a corporate network. By wearing a smart watch or other wearable device (e.g., Google Glass, a bracelet, or a necklace) that is configured as a physical security token with respect to a protected system, a user may be able to access the protected device in a less burdensome manner than if the user was not wearing the wearable device. For example, instead of entering a full-strength password to access the protected system, the user may be able to access the protected system using a four-digit key code. When the wearable device is out of range of the protected system (e.g., when the user leaves it behind at a restaurant accidentally or on the other side of his house), the protected device would no longer detect the token and would immediately enter a more secure mode (e.g., require the user to enter the full-strength password).

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

Figure 1:
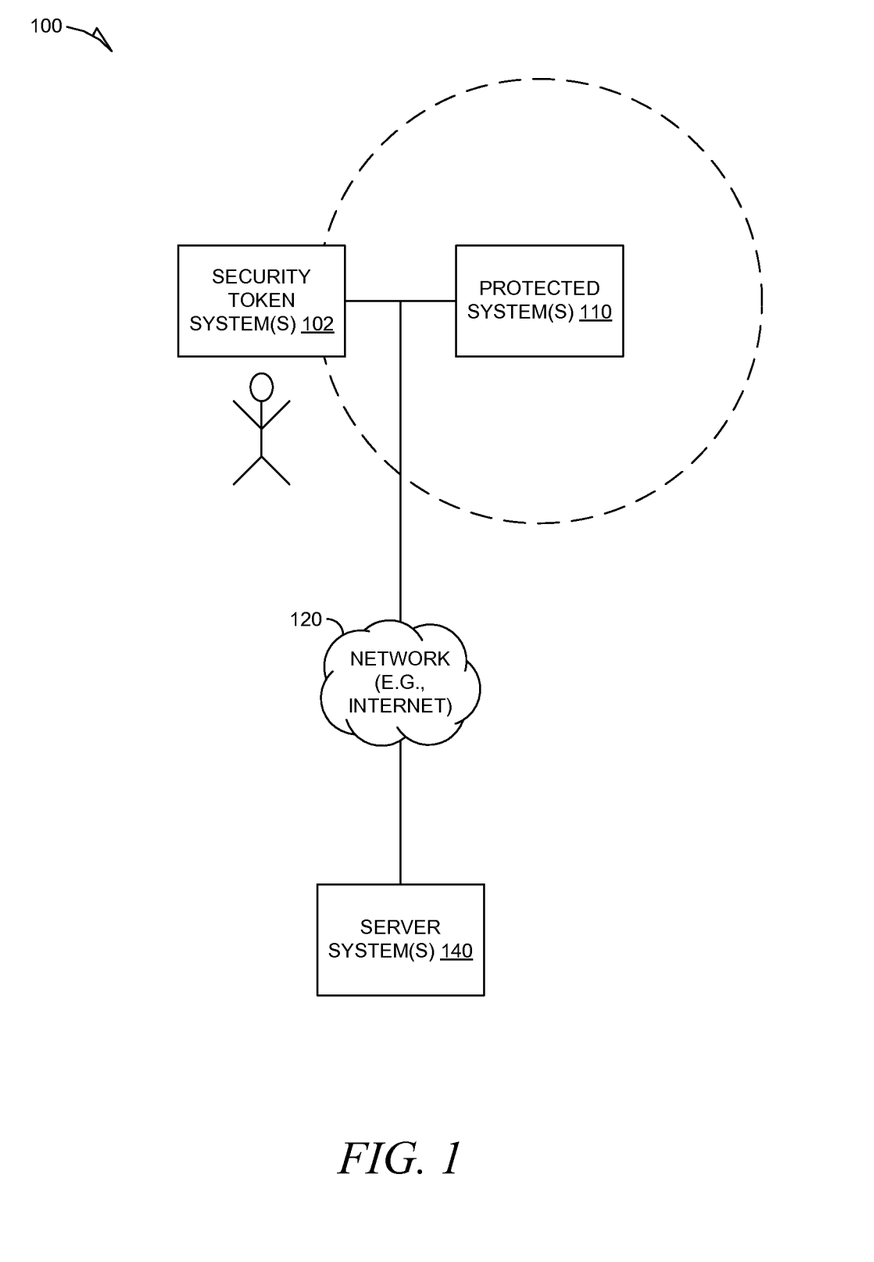
FIG. 1 is a diagram depicting an environment within which various example embodiments may be deployed.

FIG. 1 is a diagram depicting an environment 100 within which various example embodiments may be deployed. Server system(s) 140, in the example forms of a network-based marketplace or other publication system, provides server-side functionality via a network 120 (e.g., the Internet or Wide Area Network (WAN)) to one or more client systems.

FIG. 1 illustrates security token system(s) 102 and protected system(s) 110 as examples of client systems of the environment 100. In various embodiments, at least one of the security token system(s) 102 is a mobile device of the user (e.g., a wearable computing device, such as a smart watch or Google Glass). The security token system(s) 102 may be communicatively coupled to the protected system(s) 110 or the server system(s) 140 (e.g., via the network 120 or via near-field communication). In various embodiments, various security token system(s) 102 are configured to act as physical security tokens. In other words, the security token system(s) 102 may be used to assist the protected system(s)

110 in determining whether a user attempting to access the protected system(s) 110 is authorized to access the protected system(s) 110. For example, the protected system(s) 110 may determine to grant the user with a particular level of access to one or more of the protected system(s) 110 based on locations (e.g., GPS coordinates or other data obtained from a location-based services system) corresponding to the security token system(s) 102 and the protected system(s) 110 (e.g., based on one or more security token system(s) 102 being within range of one or more of the protected system(s) 110 as shown by a dashed circle surrounding the protected system(s) 110), as will be described in more detail below.

Each client system may execute one or more client applications. Examples of client applications may include web applications (e.g., a web browser application, such as the Internet Explorer browser developed by Microsoft Corporation of Redmond, Wash. or the Safari web browser developed by Apple Inc. of Cupertino, Calif.) or programmatic applications (e.g., applications configured to execute within an operating system, such as the Microsoft Windows, Android, or iOS operating system, of the client system).

In various embodiments, one or more application servers (e.g., an API server or a web server) executing on the server system(s) 140 are coupled to, and provide programmatic or web interfaces to one or more of the client systems. Each application server may host one or more server applications. Additionally, each application servers may be coupled to one or more database servers. The database servers may facilitate access to one or more databases or data stores, including NoSQL or non-relational data stores.

In various embodiments, the server applications may include one or more marketplace applications that provide a number of marketplace functions and services to users that access the server system(s) 140 (e.g., facilitating the buying or selling of items on an electronic marketplace, such as eBay). The server applications may form part of the server system(s) 140 or, in alternative embodiments, the server applications may form part of a service that is separate and distinct from the server system(s) 140.

In various embodiments, the environment 100 shown in FIG. 1 employs a client-server architecture. Various embodiments are, of course, not limited to such an architecture, and could equally well find application in a distributed, or peer-to-peer, architecture system, for example. The various server or client applications may also be implemented as standalone software programs that do not necessarily have networking capabilities.

Additionally, although FIG. 1 depicts the client systems and the server system(s) 140 as being coupled to a single network 120, it will be readily apparent to one skilled in the art that these systems may be coupled to multiple networks. For example, the server applications of the server system(s) 140 may be coupled to additional server applications, which are provided by an additional server system, via an additional network. Examples of such additional server applications may include payment applications associated with multiple payment processors (e.g., Visa, MasterCard, and American Express) or location-based services applications.

A client web application of the client systems may access the various server applications of the server system(s) 140 via the web interface supported by the web server of the server system(s) 140. Similarly, a client programmatic application of the client system may accesses the various services and functions provided by the server applications via the programmatic interface provided by the API server of the server system(s) 140.

An example of a programmatic client application may be a seller application (e.g., the TurboLister application developed by eBay Inc., of San Jose, Calif.) configured to enable sellers to author and manage listings on the server system(s) 140 in an off-line manner, and to perform batch-mode communications between the client systems and the server system(s) 140.

Another example of a programmatic client application may be a third-party application (e.g., a client application that is implemented by an entity that is not associated with the server system 140). In various embodiments, the third-party application may, utilizing information retrieved from the server system(s) 140, support one or more features or functions on a website hosted by the third party or a client application implemented by the third party. The third-party website or client application may, for example, provide one or more promotional, marketplace or payment functions that are supported by the relevant applications of the server system(s) 140.

In various embodiments, the server system(s) 140, the security token system(s) 102, or the protected system(s) 110 may include one or more applications pertaining to security measures used to protect the protected system(s) 110, as will be described in more detail below.

Figure 2:
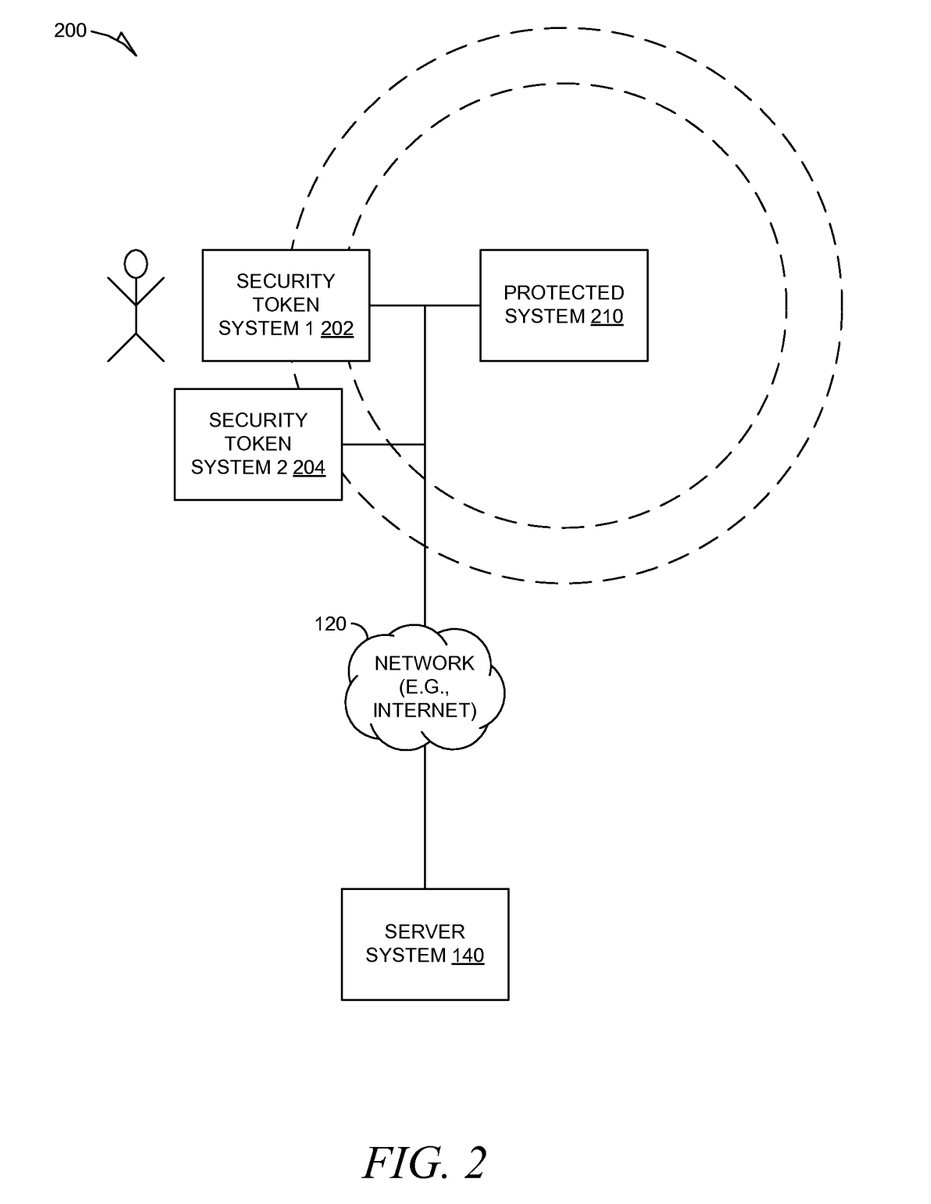
FIG. 2 is a diagram depicting the environment within which various example embodiments may be deployed.

FIG. 2 is a network diagram depicting a environment 200 within which various example embodiments may be deployed. A security token system 1 202 may be a first device of a user (e.g., Google Glass). A security token system 2 204 may be a second device of the user (e.g., a smartwatch). In various embodiments, the security token system 1 202 and security token system 2 204 may each be one of the security token systems 102 of FIG. 1.

A protected system 210 may be a protected system to which the user may desire access (e.g., an iPhone, tablet, laptop computer, and so on). In various embodiments, the protected system 210 may be one of the protected system(s) 110 of FIG. 1. In various embodiments, the security token system 1 202 may be configured to be a physical security token with respect to the protected system 210 when it comes within a first range of the protected system 210, as depicted by the dashed lines of the inner circle surrounding the protected system 210, and the security token system 2 204 may be configured to be a physical security token with the respect to the protected system 210 when it comes within a second range of the protected system 210, as depicted by the dashed lines of the outer circle surrounding the protected system 210. Each of the systems 202, 204, 210, and 140 may be communicatively coupled to one another (e.g., via the network 120 or another communication means, such as near-field communication).

Figure 3A:
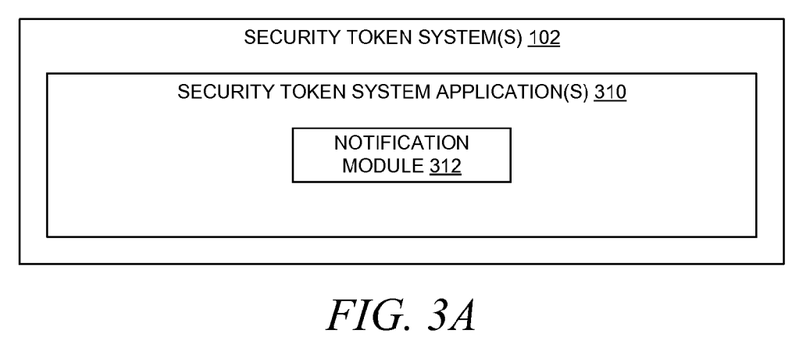
FIG. 3A-3C are block diagrams depicting various applications that the security token system(s), the protected system(s), and the server system(s) of FIG. 1 may be configured to execute.
Figure 3B:
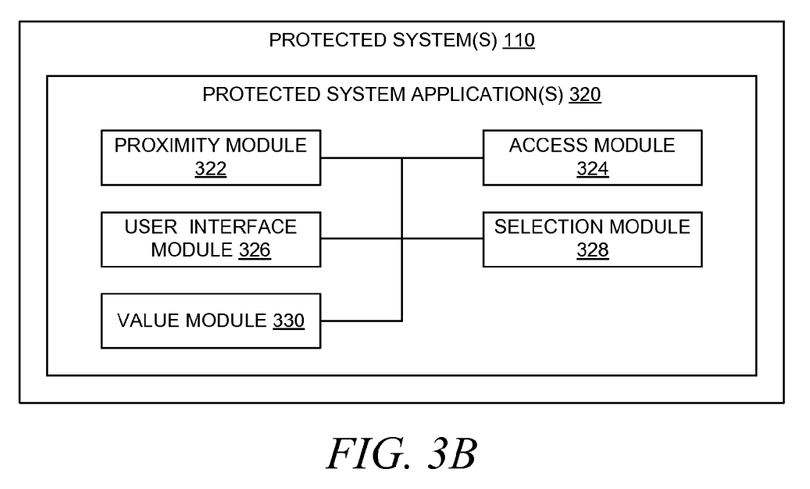
Figure 3C:
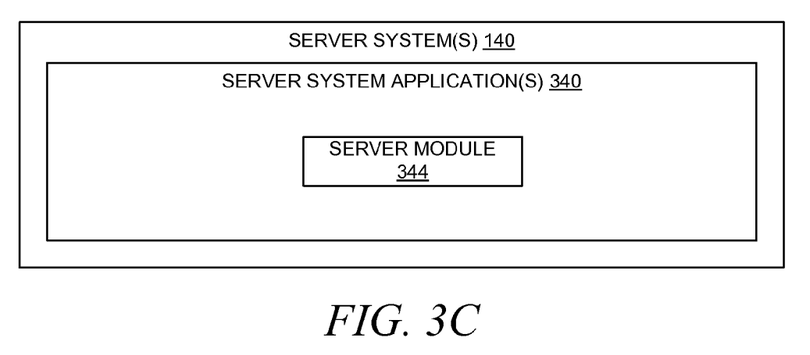

FIG. 3A-3C are block diagrams depicting various applications that the security token system(s) 102, the protected system(s) 110, and the server system(s) 140 may be configured to execute. In FIG. 3A, protected system application(s) may be configured to execute on one or more of the security token system(s) 102. A notification module 312 may be configured to allow an administrator of a protected system (e.g., the protected system 210) to configure a proximity within which a security token system (e.g., security token system 1 202) must be to the protected system for the security token system to be used as a physical security token with respect to the protected system, as is described in more detail below. The notification module 312 may also be configured to notify a protected system that it is within the specified range of the protected system. In various embodiments, the range within which a particular security token system must be to the protected system may depend on properties of the security token system, such as a level of security of the particular security token system.

In FIG. 3B, protected system application(s) 320 may be configured to execute on one or more of the protected system(s) 110. A proximity module 322 may be configured to determine whether a security token system is within a specified range of a protected system. An access module 324 may be configured to determine a level of security of the protected system (e.g., whether to allow a user to access the protected system by satisfying a reduced security measure). A user interface module 326 may be configured to present a user of a protected system with an option to access the protected system by satisfying a selected reduced security measure. A selection module 328 may be configured to select a reduced security measure from a plurality of security measures based on, for example, a level of sensitivity or classification of data associated with a function of the protected system that the user is attempting to access. A value module 330 may be configured to associate security token values with security token systems based on properties of the security token systems, as is described in more detail below.

In FIG. 3C, protected server system application(s) 340 may be configured to execute on the server system(s) 140. A server module 344 may provide functionality that the user wishes to access from a protected device. For example, the server module 344 may provide marketplace functionality that allows the user of the protected device to manage transactions on a network-based publication system (e.g., eBay). Upon accessing the protected device, the user may be able to buy or sell items (e.g., goods or services) using the server module 344. In various embodiments, access to the server module 344 is restricted based on access to the protected system. Thus, a user may not be able to access the server module 344 unless the user accesses the protected system first. Reducing friction associated with accessing the protected system may enable the user to act more quickly in performing time-sensitive tasks.

Figure 4:
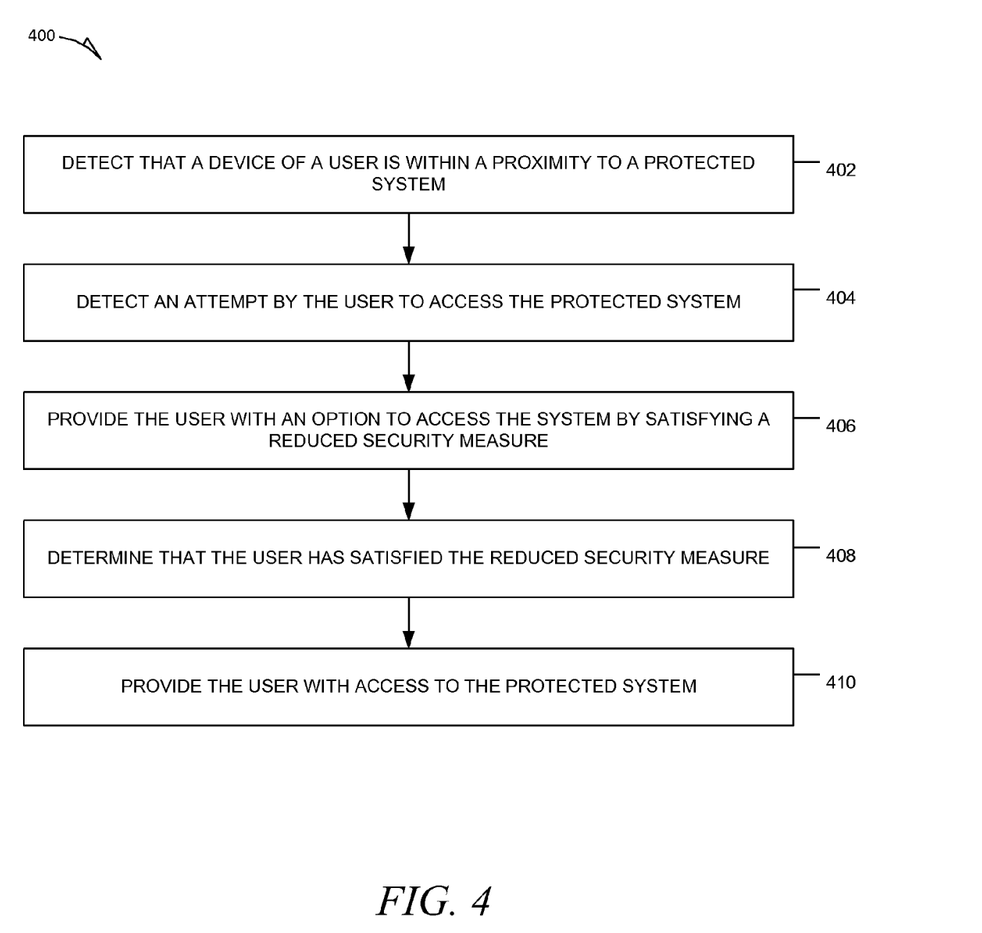
FIG. 4 is a flowchart illustrating an example embodiment of a method of providing a user with access to a protected system.

FIG. 4 is a flowchart illustrating an example embodiment of a method 400 of providing a user with access to a protected system. In various embodiments, the method 400 may be implemented by any module or combination of modules of the modules 312, 322, 324, 326, 328, 330, and 344 of FIG. 3A-3C. At operation 402, the proximity module 322 may detect that at least one of the security token systems 102 is within a proximity to at least one of the protected system(s) 110. In various embodiments, the proximity module 322 may determine the necessary proximity based on an input from an administrator of the protected system(s) 110. For example, an administrator may specify (e.g., via a configuration option of the protected system applications 320) that at least one of the security token system(s) 102 must be within two feet of at least one of the protected system(s) 110 for the user to be provided with an option to access the protected system(s) 110 by satisfying a reduced security measure.

Furthermore, the proximity module 322 may receive a notification specifying the location of one or more of the security token system(s) 102 (e.g., the GPS coordinates of the security token system(s) 102). The proximity module 322 may receive the notification from one or more of the security token system(s) 102 (e.g., via a near-field communication or wireless network communication), from the server system(s) 140 (e.g., via a wireless network communication), or from another system (e.g., a location-based services system). In various embodiments, the proximity module 322 may determine whether one or more of the security token system(s) 102 is within the specified proximity of the protected system(s) 110 based on a receiving of a communication (e.g., from a location-based services application executing on one of the server system(s) 140) that includes a specification of the location of the one or more security token system(s) 102 and a receiving of a communication that includes a specification of the location of one or more of the protected system(s) 110. In various embodiments, the proximity module may determine whether one or more security token system(s) 102 is within the specified proximity of the protected system(s) 110 based on a receiving of a communication or signal directly from the one or more security token system(s) 102.

At operation 404, the access module 324 may detect an attempt by a user to access one or more of the protected system(s) 110. For example, the access module 324 detects that the user has pressed a button on one of the protected system(s) 110. For example, if the protected system is a smart phone (e.g., an iPhone 4s), the access module 324 may detect that the user has pressed a button on the smart phone, such as a "Sleep/wake" button or a "Home button," that enables the user to access the smart phone.

At operation 406, the user interface module 326 may provide the user with an option to access one or more of the protected system(s) 110 by satisfying a reduced security measure. In various embodiments, the user interface module 326 may provide this option based on the determination by the proximity module 322 that one or more of the security token system(s) 102 is within a specified proximity to one or more of the protected system(s) 110. In various embodiments, the reduced security measure may be selected (e.g., by the selection module 328) from a plurality of possible security measures based on various factors, as is described in more detail below. As an example, if a first (or default) security measure of the protected system(s) 110 requires that the user enter a password having a first strength (e.g., as a function of length, complexity, or unpredictability), a second (or reduced) security measure of the protected system(s) 110 may require that the user enters a password having a second strength, wherein the second strength is less than the first strength. As another example, if a default security measure of the protected system(s) 110 requires that the user enters a password to access the protected system 110, the reduced security measure of the protected system(s) 110 may require the user to simply enter a short (e.g., four-digit) code to access the protected system(s) 110.

At operation 408, the access module 324 determines that the user has satisfied the reduced security measure. For example, the access module 324 determines that the user has entered a proper reduced-strength password or that the user has entered a proper shortened code to access the protected system(s) 110. Or the access module 324 determines that the user has provided a proper biometric input (e.g., a fingerprint scan instead of a retina scan).

At operation 410, the access module 324 provides the user with access to the protected system(s) 110 (e.g., based on the determination the user has satisfied the reduced security measure). For example, the access module 324 may enable the user to view data, run applications, or otherwise access features of the protected system(s) 110. In various embodiments, the access module 324 may restrict access to particular features (e.g., applications or data) based on whether the user satisfied the reduced security measure or a higher security measure. Thus, for example, the access module 324 may provide the user with access to the marketplace applications of the protected system(s) 110 such that the user may engage in actions associated with the buying or selling of items listed with respect to the server system(s) 140, but the access module 324 may not provide the user with access to other applications, such as email applications or applications have data or functionality that the access module 324 deems to be more sensitive than data or functionality that is accessible from other applications (e.g., based on input from an administrator of the protected system(s) 110).

Figure 5:
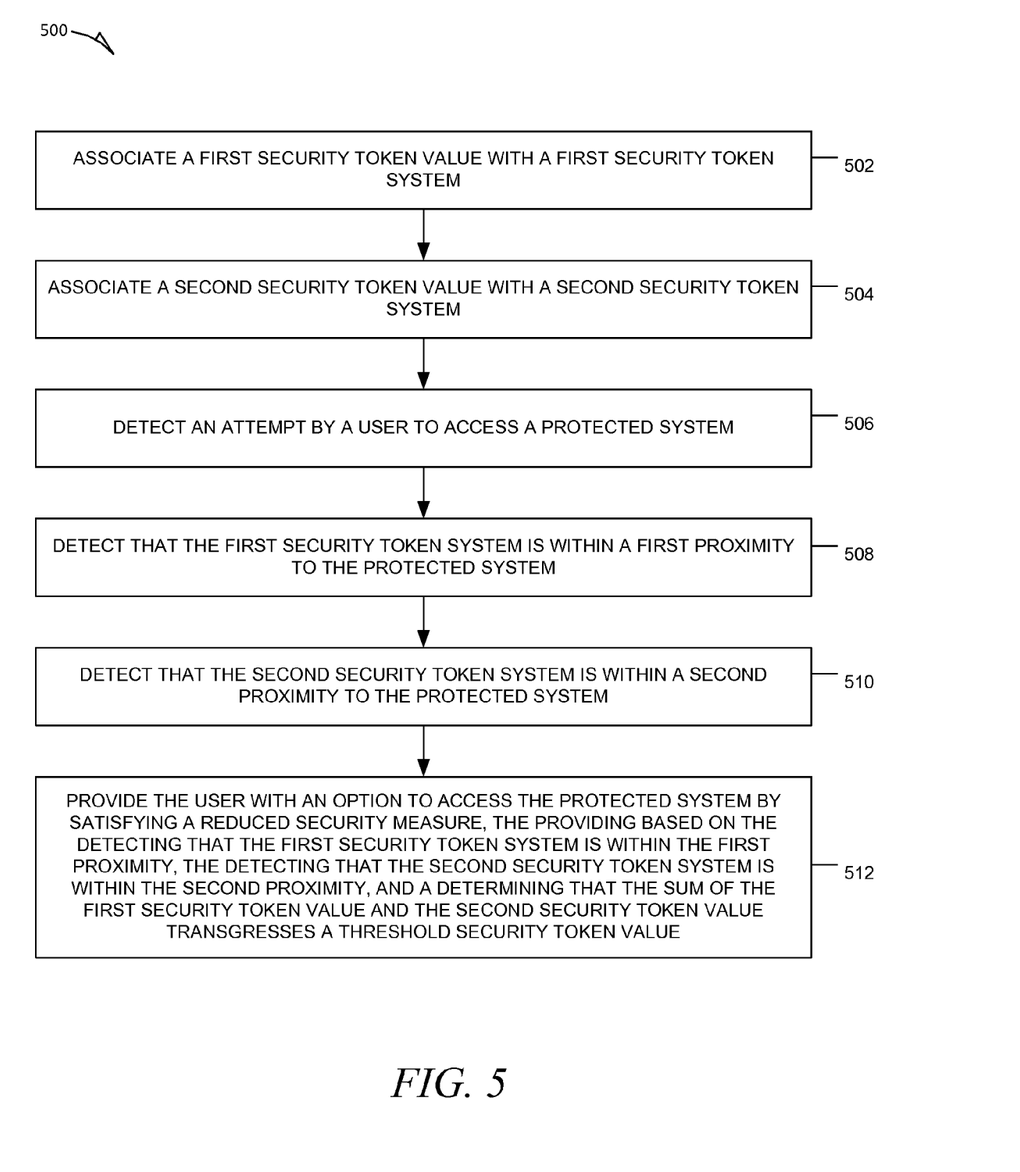
FIG. 5 is a flowchart illustrating an additional example embodiment of a method of providing a user with access to a protected system.

FIG. 5 is a flowchart illustrating an alternative example embodiment of a method 500 of providing a user with access to a protected system. In various embodiments, the method 500 may be implemented by any module or combination of modules of the modules 312, 322, 324, 326, 328, 330, and 344 of FIG. 3A-3C.

At operation 502, the value module 330 associates a first security token value with a first security token system (e.g., the security token system 1 202). In various embodiments, the value module 330 may determine the first security token value based on a property of the security token system 1 202, such as a reliability of the security token system 1 202 to be used as a first security token for accessing the protected system 110. In various embodiments, the value module 330 may determine the reliability based on a likelihood that the security token system 1 202 is currently in the possession of the user that is authorized to access the protected system(s) 110 by satisfying a reduced security measure. For example, the value module 330 may associate a higher security token value to the security token system 1 202 based on a determination that the security token system 1 202 is a wearable computing device, such as earrings or a watch, that is less likely to be lost by the user or stolen from the user, such as a tablet or a smart phone.

At operation 504, the value module 330 associates a second security token value with a second security token system. In various embodiments, the second security token value is equal to, less than, or greater than the first security token value based on a level of reliability of the security token system 2 204 in comparison to the security token system 1 202 for use as a physical security token for determining whether to provide a user with access the protected system(s) 110 based on the user satisfying a reduced security measure.

At operation 506, the access module 324 detects an attempt by the user to access one of the protected system(s) 110.

At operation 508, the proximity module 322 detects that a first device (e.g., the security token system 1 202) is within a first proximity to the protected system(s) 110. In various embodiments, an administrator of the protected system may specify a distance (e.g., 2 feet) within which the first device must be to the protected system in order to trigger a possible reduction in the security measure that the user must satisfy to access the protected system(s) 110.

At operation 510, the proximity module 322 detects that a second device (e.g., the security token system 2 202) is within a second proximity to the protected system(s) 110. In various embodiments, the second proximity may be a different proximity than the first proximity. In other words, each security token system device may have a different proximity within which it must be to the protected system(s) 110 in order to have an effect on whether the user may access the protected system(s) 110 by satisfying a reduced security measure. In various embodiments, the required proximity for a particular device may be based on the security token value associated with the particular device. For example, a device having a greater security token value may require less proximity than a device having a smaller security token value.

At operation 510, the user interface module 326 provides the user with an option to access the protected system(s) 110 by satisfying a reduced security measure. In various embodiments, the user interface module 326 provides this option based on the detecting that the first device is within the first proximity and the second device is within the second proximity. Furthermore, in various embodiments, the user interface module 326 provides this option based on a determination that the sum of the first security token value and the second security token value equals transgresses a threshold security token value. Thus, for example, if the first security token value is 3 and the second security token value is 8, the user interface module 326 may provide the user with this option if the threshold security token value (e.g., as specified by an administrator of the protected system(s) 110) is 11 or less.

Figure 6:
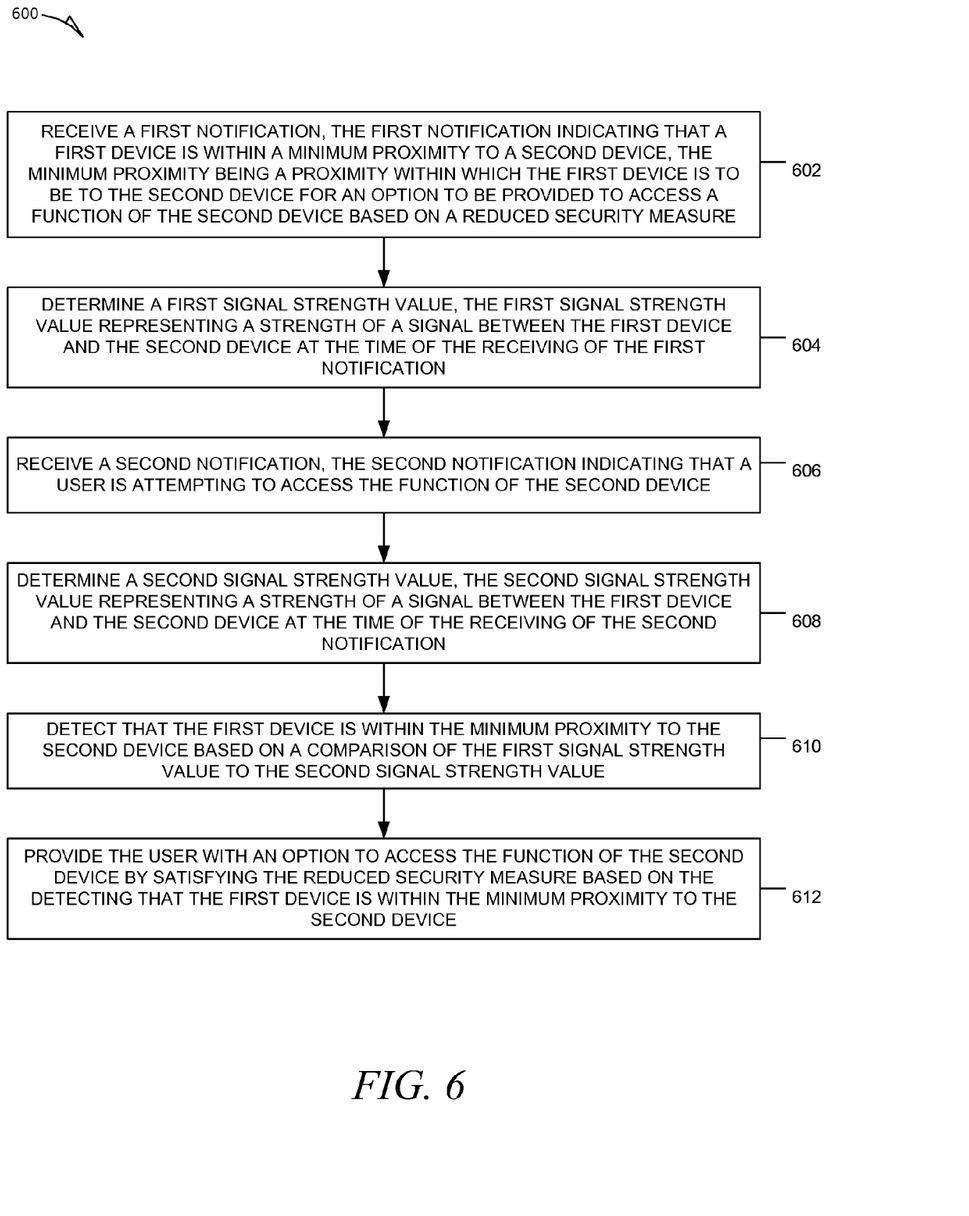
FIG. 6 is a flowchart illustrating an example embodiment of a method of calibrating a measurement of proximity between a security token system and a protected system.

FIG. 6 is a flowchart illustrating an example embodiment of a method 600 of calibrating a measurement of proximity between a security token system and a protected system. In various embodiments, the method 400 may be implemented by any module or combination of modules of the modules 312, 322, 324, 326, 328, 330, and 344 of FIG. 3A-3C. At operation 602, the proximity module 322 may receive a first notification. The first notification may indicate that a first device (e.g., security token system 1 202) is within a minimum proximity to a second device (e.g., the protected system 210).

In various embodiments, the first notification is received from the first device (e.g., via the notification module 312) based on an accessing of the first device by an administrator of the protected system. For example, if the second device is an iPhone of a user and the first device is a smartwatch of the user, the user may access the smartwatch as an administrator of the smartwatch and trigger the sending of the first notification via the notification module 312. Thus, the user may set or calibrate a desired minimum distance at which the smartwatch must be from the iPhone in order for the smartwatch to be used as a physical security token that assists in determining a level of security of the second device. While the smartwatch is at the desired distance, the user may cause the first notification to be sent from the smartwatch to the iPhone. The user may keep the smartwatch at the desired distance until the user receives confirmation from the iPhone that the first notification has been received by the iPhone. In various embodiments, the first notification may include a strength of a signal between the first device and the protected device as measured by a sensor the first device. Thus, the user may calibrate the distance within which the smartwatch must be to the protected device in order for the protected device to treat the smartwatch as a physical security token.

At operation 604, the proximity module 322 may determine a first signal strength value, the first signal strength value representing a strength of a signal between the first device and the second device at the time of the receiving of the notification by the second device. For example, the proximity module 322 may access a sensor of the second device (e.g., via an API of the protected device) to receive information pertaining to the signal strength between the second device and the first device. Or the signal proximity module 322 may use the information received in the first notification pertaining to the signal strength.

At operation 606, the access module 324 may receive a second notification. The second notification may indicate that a user is attempting to access the function of the second device. For example, the second notification may include an indication that the user is attempting to access a marketplace application executing on the second device. The second notification may further include an indication of a strength of a signal between the first device and the second device as measured by a sensor of the first device.

At operation 608, the proximity module 322 may determine a second signal strength value. The proximity module 322 may determine the second signal strength value based on the information pertaining to the signal strength received in the second notification. Alternatively, the proximity module 322 may determine the second signal strength value based on an accessing of a sensor of the second device.

At operation 610, the proximity module 322 may detect that the first device is within the minimum proximity to the second device. The proximity module 322 may make this detection based on a comparison of the first signal strength value to the second signal strength value. For example, if the second signal strength value is greater than or equal to the second signal strength value, the proximity module 322 may determine that the first device is within the minimum proximity to the second device.

At operation 612, the user interface module 326 may provide the user with an option to access the function of the second device by satisfying a reduced security measure. In various embodiments, the user interface module 326 provides this option based on the detecting that the first device is within the minimum proximity to the second device.

Figure 7:
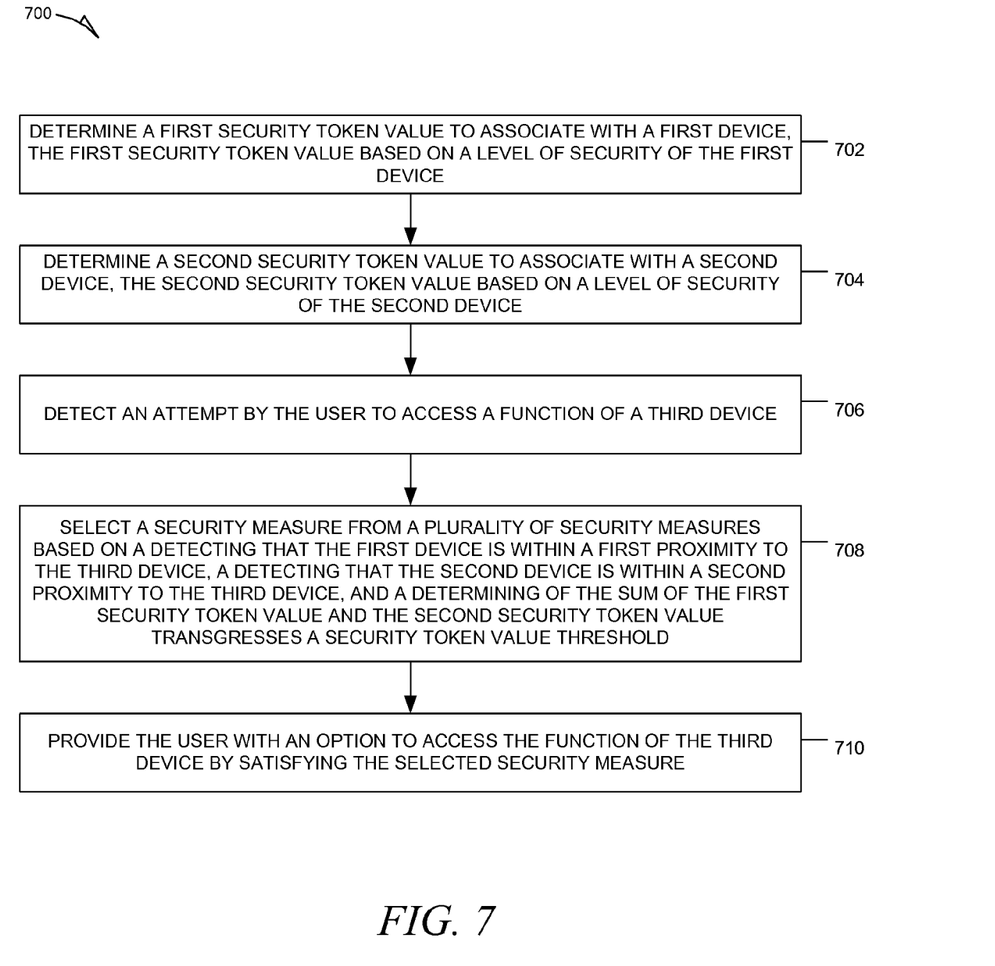
FIG. 7 is a flowchart illustrating an additional example embodiment of a method of providing a user with access to a protected system.

FIG. 7 is a flowchart illustrating yet another example embodiment of a method 700 of providing a user with access to a protected system (e.g., the protected system 210). In various embodiments, the method 400 may be implemented by any module or combination of modules of the modules 312, 322, 324, 326, 328, 330, and 344 of FIG. 3A-3C. At operation 702, the proximity module 322 may determine a first security token value to associate with a first device (e.g., security token system 1 202). The proximity module 322 may make this determination based on a property of the first device. For example, the proximity module 322 may determine a reliability of the first device to be used as a physical security token, as described above. Or the proximity module 322 may use another measure, such as a level of security of the first device (e.g., as specified by an administrator of the protected system).

At operation 704, the proximity module 322 may determine a second security token value to associate with a second device (security token system 2 204). This second security token value may be based on a property of the second device.

At operation 706, the access module 324 may detect an attempt by the user to access a function of a third device (e.g., protected system 210).

At operation 708, the access module 324 may select a security measure from a plurality of security measures based on a detecting that the first device is within a proximity to the third device, a detecting that the second device is within a minimum proximity to the third device, and a determining that the sum of the first security token value and the second security token value transgresses or equals a security token value threshold, as described above. In various embodiments, the plurality of security measures may include a first security measure (e.g., a password having a strength value that exceeds a particular value), a second security measure (e.g., a pin code having a predetermined number of digits), a third security measure (e.g., a pressing of a particular button or series of buttons on the protected device), and additional security measures having various ranges or combinations.

In various embodiments, the security measure is selected according to the sensitivity of the data associated with the function (e.g., as specified by an administrator of the protected device). Thus, for functions that would enable the user to access data on the device that is extremely sensitive or classified, the selected reduced security measure may be more burdensome to the user than the selected reduced security measure for a function that does not entail access to such sensitive data.

At operation 710, the access module 324 provides the user with an option to access the function of the third device by satisfying the selected security measure.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
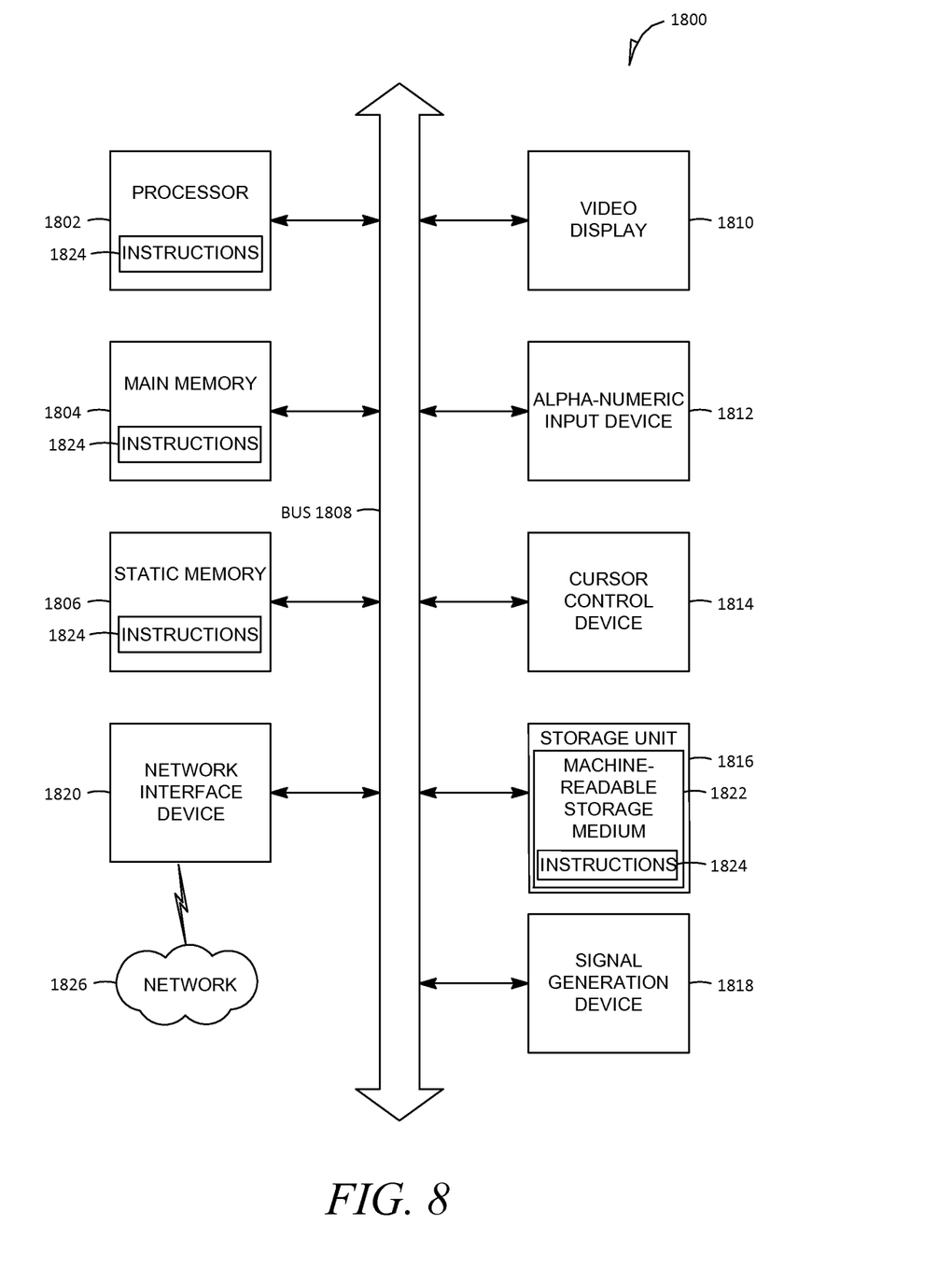
FIG. 8 is a block diagram of machine in the example form of a computer system within which instructions for causing the machine to perform any one or more of the methodologies discussed herein may be executed.

FIG. 8 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining a first security token value based on a closeness of a possession of a first security token system by a user, the closeness of the possession including a measure of a connectedness between the first security token system and the user, the measure of connectedness between the first security token system and the user being greater if the first security token system is a wearable computing device than if the first security token system is a non-wearable computing device;
   determining a second security token value based on a closeness of a possession of a second security token system to the user, the closeness of the possession including a measure of a connectedness between the second security token system and the user, the measure of connectedness between the second security token system and the user being greater if the second security token system is the wearable computing device than if the second security token system is the non-wearable computing device;
   associating the first security token value with the first security token system;
   associating the second security token value with the second security token system;
   detecting an attempt by the user to access a protected system; and
   providing the user with an option to access the protected system by satisfying a reduced security measure, the providing based on a determining that a combined value of the first security token value and the second security token value transgresses a threshold security token value, the providing of the user with the option to access the protected system by satisfying the reduced security measure being performed by a processor.

2. The method of claim 1, further comprising:
   detecting that the first security token system is within a first proximity to the protected system;
   detecting that the second security token system is within a second proximity to the protected system; and
   wherein the providing of the user with the option is further based on the detecting that the first security token system is within the first proximity and the detecting that the second security token system is within the second proximity.

3. The method of claim 2, further comprising:
   detecting that the first security token system is outside the first proximity or that the second security token system is outside the second proximity; and
   revoking the option to access the protected system based on the detecting that the first security token system is outside the first proximity or that the second security token system is outside the second proximity.

4. The method of claim 1, wherein the access to the protected system is limited to a subset of functions of the protected system based on a sensitivity of the subset of the functions and the combined value.

5. The method of claim 1, further comprising providing the user with an option to access the protected system by satisfying an additional reduced security measure, the providing based on a determining that the combined value transgresses an additional threshold security token value.

6. A system comprising:
at least one hardware processor;
at least one module implemented by the at least one hardware processor, the at least one module configured to, at least:
determine a first security token value based on a closeness of a possession of a first security token system by a user, the closeness of the possession including a measure of a connectedness between the first security token system and the user, the measure of connectedness between the first security token system and the user being greater if the first security token system is a wearable computing device than if the first security token system is a non-wearable computing device;
determine a second security token value based on a closeness of a possession of a second security token system to the user, the closeness of the possession including a measure of a connectedness between the second security token system and the user, the measure of connectedness between the second security token system and the user being greater if the second security token system is the wearable computing device than if the second security token system is the non-wearable computing device;
associate the first security token value with the first security token system;
associate the second security token value with the second security token system;
detect an attempt by the user to access a protected system; and
provide the user with an option to access the protected system by satisfying a reduced security measure, the providing based on a determining that a combined value of the first security token value and the second security token value transgresses a threshold security token value, the providing of the user with the option to access the protected system by satisfying the reduced security measure being performed by a processor.

7. The system of claim 6, the at least one module further configured to, at least:
detect that the first security token system is within a first proximity to the protected system;
detect that the second security token system is within a second proximity to the protected system; and
wherein the providing of the user with the option is further based on the detecting that the first security token system is within the first proximity and the detecting that the second security token system is within the second proximity.

8. The system of claim 7, the at least one module further configured to, at least:
detect that the first security token system is outside the first proximity or that the second security token system is outside the second proximity; and
revoke the option to access the protected system based on the detecting that the first security token system is outside the first proximity or that the second security token system is outside the second proximity.

9. The system of claim 6, wherein the access to the protected system is limited to a subset of functions of the protected system based on a sensitivity of the subset of the functions and the combined value.

10. The system of claim 6, the at least one module further configured to, at least provide the user with an option to access the protected system by satisfying an additional reduced security measure, the providing based on a determining that the combined value transgresses an additional threshold security token value.

11. A non-transitory machine readable medium embodying a set of instructions that, when executed by at least one processor, causes the at least one processor to perform operations, the operations comprising:
determining a first security token value based on a closeness of a possession of a first security token system by a user, the closeness of the possession including a measure of a connectedness between the first security token system and the user, the measure of connectedness between the first security token system and the user being greater if the first security token system is a wearable computing device than if the first security token system is a non-wearable computing device;
determining a second security token value based on a closeness of a possession of a second security token system to the user, the closeness of the possession including a measure of a connectedness between the second security token system and the user, the measure of connectedness between the second security token system and the user being greater if the second security token system is the wearable computing device than if the second security token system is the non-wearable computing device;
associating the first security token value with the first security token system;
associating the second security token value with the second security token system;
detecting an attempt by the user to access a protected system; and
providing the user with an option to access the protected system by satisfying a reduced security measure, the providing based on a determining that a combined value of the first security token value and the second security token value transgresses a threshold security token value, the providing of the user with the option to access the protected system by satisfying the reduced security measure being performed by a processor.

12. The non-transitory machine readable medium of claim 11, further comprising:
detecting that the first security token system is within a first proximity to the protected system;
detecting that the second security token system is within a second proximity to the protected system; and
wherein the providing of the user with the option is further based on the detecting that the first security token system is within the first proximity and the detecting that the second security token system is within the second proximity.

13. The non-transitory machine readable medium of claim 12, further comprising:
detecting that the first security token system is outside the first proximity or that the second security token system is outside the second proximity; and
revoking the option to access the protected system based on the detecting that the first security token system is outside the first proximity or that the second security token system is outside the second proximity.

14. The non-transitory machine readable medium of claim 11, wherein the access to the protected system is limited to a subset of functions of the protected system based on a sensitivity of the subset of the functions and the combined value.

* * * * *

UNITED STATES PATENT AND TRADEMARK OFFICE
CERTIFICATE OF CORRECTION

PATENT NO. : 9,589,123 B2
APPLICATION NO. : 14/921431
DATED : March 7, 2017
INVENTOR(S) : Eric J. Farraro It is certified that error appears in the above-identified patent and that said Letters Patent is hereby corrected as shown below:

On page 3, in Column 1, under "Other Publications", Line 23, delete "authenticaton" and insert --authentication-- therefor Signed and Sealed this
Twenty-fourth Day of April, 2018

Andrei Iancu
*Director of the United States Patent and Trademark Office*